(12) United States Patent
Hoshiya et al.

(10) Patent No.: US 7,697,245 B2
(45) Date of Patent: Apr. 13, 2010

(54) CPP-GMR MAGNETIC HEAD HAVING GMR-SCREEN LAYER

(75) Inventors: Hiroyuki Hoshiya, Kanagawa (JP); Katsumi Hoshino, Kanagawa (JP); Kenichi Meguro, Kanagawa (JP); Yo Sato, Kanagawa (JP); Hiroyuki Katada, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 637 days.

(21) Appl. No.: 11/584,397

(22) Filed: Oct. 19, 2006

(65) Prior Publication Data

US 2007/0091511 A1    Apr. 26, 2007

(30) Foreign Application Priority Data

Oct. 20, 2005    (JP)    ............... 2005-306251

(51) Int. Cl.
*G11B 5/39*    (2006.01)
(52) U.S. Cl. .................................... 360/324.1
(58) Field of Classification Search ....... 360/324–324.2
See application file for complete search history.

(56) References Cited

U.S. PATENT DOCUMENTS

| | | | |
|---|---|---|---|
| 6,560,077 B2 * | 5/2003 | Fujiwara et al. .......... | 360/324.1 |
| 6,707,649 B2 * | 3/2004 | Hasegawa et al. ...... | 360/324.12 |
| 6,937,446 B2 | 8/2005 | Kamiguchi et al. | |
| 7,206,174 B2 * | 4/2007 | Sbiaa et al. .............. | 360/324.1 |
| 7,277,262 B2 * | 10/2007 | Takagishi et al. ........ | 360/324.2 |
| 7,423,851 B2 * | 9/2008 | Sbiaa ...................... | 360/324.2 |
| 7,433,161 B2 * | 10/2008 | Ikarashi et al. ......... | 360/324.11 |
| 7,514,117 B2 * | 4/2009 | Fukuzawa et al. ........... | 427/127 |
| 2002/0097538 A1 | 7/2002 | Seyama et al. | |
| 2002/0135956 A1 | 9/2002 | Hasegawa et al. | |
| 2003/0011945 A1 | 1/2003 | Yuasa et al. | |
| 2003/0128481 A1 | 7/2003 | Seyama et al. | |
| 2004/0169963 A1 | 9/2004 | Okuno et al. | |
| 2004/0240124 A1 | 12/2004 | Sbiaa | |
| 2005/0002126 A1 * | 1/2005 | Fujiwara et al. .......... | 360/324.1 |
| 2005/0111144 A1 * | 5/2005 | Sbiaa ...................... | 360/324.2 |
| 2005/0157435 A1 * | 7/2005 | Ikarashi et al. ......... | 360/324.11 |
| 2006/0023376 A1 * | 2/2006 | Gill ........................ | 360/324.12 |

OTHER PUBLICATIONS

European Patent Office (EPO) Search Report for EPO patent application EP06017833 (Jun. 5, 2008).
Chinese Office Action for Application No. 200610132031.8, dated Oct. 31, 2008, 11 pages total.

* cited by examiner

*Primary Examiner*—William J Klimowicz
(74) *Attorney, Agent, or Firm*—Townsend and Townsend and Crew LLP; Rambod Nader

(57) ABSTRACT

A spin-valve type magnetic head which has sufficiently high output is provided. In one embodiment, a structure in which high output coexists with high stability is achieved by letting a GMR-effect and a current-path-confinement effect manifest themselves at the same time in a GMR-screen layer consisting of a ferromagnetic metal spike-like part and a half-covering oxide layer.

8 Claims, 14 Drawing Sheets

Fig. 3
a) formation of precursor ferromagnetic metal layer
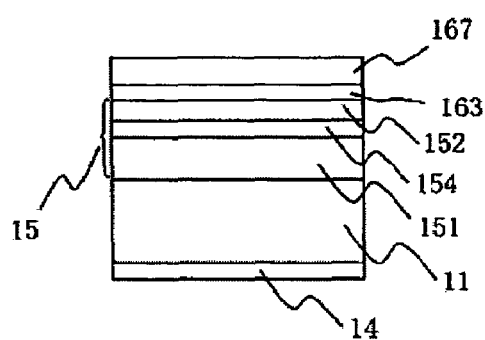
b) oxidation of precursor ferromagnetic metal layer
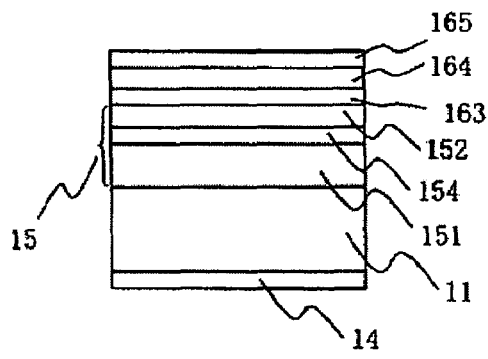
c) formation of remained parts of magneoresistive layered film
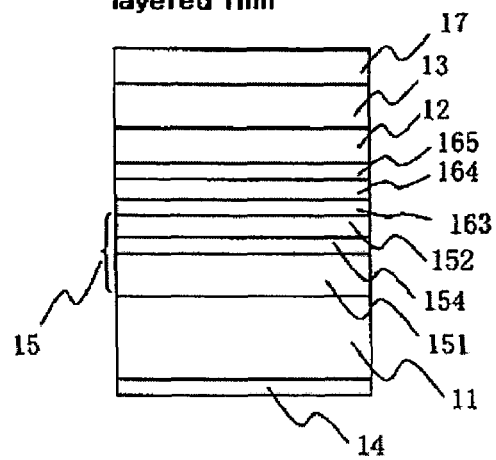
d) half-covering thermal treatment
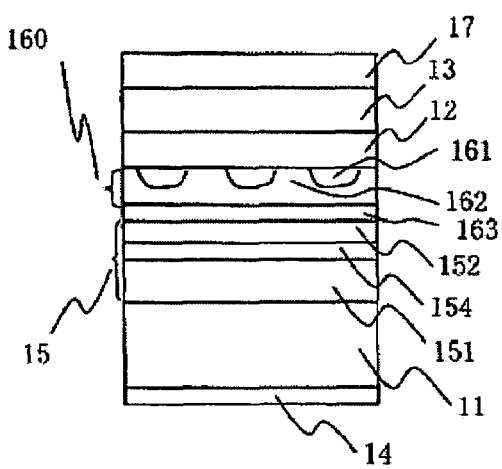

Fig. 5
GMR region of present invention
(a)
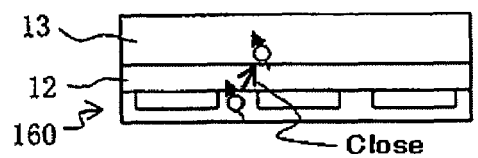
GMR region of prior art-1
(b) soft magnetic free layer
nonmagnetic intermediate layer
(current screen layer)
ferromagnetic pinned layer
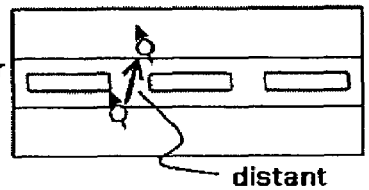
(PRIOR ART)
GMR region of prior art-2
(c) soft magnetic free layer
nonmagnetic intermediate layer
ferromagnetic pinned layer
(current screen layer)
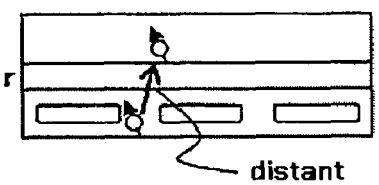
(PRIOR ART)

CPP-GMR MAGNETIC HEAD HAVING GMR-SCREEN LAYER

CROSS-REFERENCES TO RELATED APPLICATIONS

This application claims priority from Japanese Patent Application No. JP2005-306251, filed Oct. 20, 2005, the entire disclosure of which is incorporated herein by reference.

BACKGROUND OF THE INVENTION

The present invention relates to a magnetic recording/reproducing apparatus and a magnetic head equipped therein, and specifically, relates to a magnetic head for a high density magnetic recording/reproducing apparatus and a manufacturing method thereof.

A magnetoresistive magnetic head is used for a read sensor in a high density magnetic recording technology mainly composed of a hard disk and is a part which exerts a strong influence on the performance of the magnetic recording technology. Within the framework where the recording density of magnetic recording apparatus was made higher rapidly, the prior art could not achieve a magnetic recording apparatus with a sufficiently high recording density; specifically a magnetoresistive magnetic head which functions as the read element with sufficient output and sensitivity against external magnetic fields, and excellent characteristics with sufficient stability could not be obtained, so that it has been difficult to achieve the functions of a recording apparatus.

Recently, it is well known that the magnetoresistance of a multi-layered film in which ferromagnetic metal layers are stacked through a non-magnetic metal layer, a so-called giant magnetoresistance, is large. In the past, when this magnetoresistance is used for a magnetic head, a current flowing in the plane of the layered film, a so-called CIP-GMR, is used. Moreover, recently there has been research on a current-perpendicular-to-the-plane giant magnetoresistance, a so-called CPP-GMR, in which current flows in the film thickness direction of the layered film. The present invention relates to a magnetoresistive spin-valve sensor and a magnetic head using a CPP-GMR. Examples of patent references in this field include JP-A No. 204094/2003, JP-A No. 208744/2002, and JP-A No. 355682/2004.

BRIEF SUMMARY OF THE INVENTION

A disadvantage of a magnetic head using a conventional magnetoresistive magnetic sensor is that it cannot achieve high output. Specifically, a problem in the technology of a so-called confined-current-path type CPP-GMR is that it cannot control the fabrication of a fine pin-hole structure for partially flowing current in the film thickness direction. The structure for partially flowing current in the film thickness direction is herein called a screen layer. Patent documents 1 and 2 concretely describe configurations in which a screen layer is introduced for a part of the CPP-GMR layered film. Since the screen layer is a technology in which the value of the electric resistance is partially increased by confining current flowing in the film thickness direction and a large output is obtained, the shape and the size of the region of the screen layer where current flows and the position of the screen layer greatly affect the output of the confined-current-path type CPP-GMR layered film. On the other hand, the thin film layer, which is a structural element of the CPP-GMR layered film, including the screen layer, is very thin. The GMR effect is a spin-dependent scattering effect of electrons which are created in a region with a thickness of about several nanometers. The screen layer does not simply confine the current, but it also, without disturbing the spin-dependent scattering effect of electrons, which is the principle of GMR, has to affect the resistance in which the magnetoresistance is enlarged by confining the current to the region where the GMR is generated. Therefore, a structure having fine holes has to be made well controlled and, without damaging the basic part of the GMR, be made extremely close to this basic part. Therefore, in a conventional technology, it is impossible to improve the output of a confined-current-path type CPP-GMR.

It is a feature of the present invention to provide a confined-current-path type CPP-GMR which can achieve stably a high magnetoresistance and a high output.

In the present invention, as a way to solve the above-mentioned problems, a magnetoresistive layered film is used which has a GMR-screen layer having altogether both a current-path-confinement effect and a GMR effect. It becomes possible to effectively bring about the current-path-confinement effect without giving damage to the GMR effect by achieving in a single structure the aforementioned two effects which were usually independent.

In order to bring together the aforementioned two effects, the GMR-screen layer is constructed with a structure consisting of a composite of a ferromagnetic metal layer and an oxide layer, in which the oxide layer with holes covers the lower layer of the ferromagnetic metal layer and a part of the lower layer of the ferromagnetic metal layer is exposed through the hole part of the upper oxide layer.

According to a structure in which a soft magnetic free layer, a non-magnetic intermediate layer, and a GMR-screen layer are stacked adjacently, in order, a part of the ferromagnetic metal layer of the GMR-screen layer is exposed or spiked at the interface of the non-magnetic intermediate layer through the hole parts of the oxide layer, resulting in a GMR effect being achieved at parts of the soft magnetic free layer/non-magnetic intermediate layer/spiking parts of the ferromagnetic metal layer. According to such a structure, the GMR-screen layer achieves both a current-path confinement structure in which the current path flowing in the film thickness direction can be suitably confined, and at the same time, a GMR effect in which the exposed ferromagnetic metal layer through the holes in the oxide layer and the soft magnetic free layer interact with each other. In the following, the aforementioned exposed or protruding parts of the ferromagnetic metal layer may be called a spike-like ferromagnetic metal.

The GMR screen layer is stacked with a ferromagnetic pinned layer through the separation-coupling layer. The separation-coupling layer performs the function of making fine holes well controlled which determines the current-path-confinement effect of the oxide layer having the hole part of the GMR-screen layer by physically separating the GMR-screen layer from the ferromagnetic pinned layer. Moreover, at the same time, the separation-coupling layer lets a ferromagnetic coupling force work between the GMR-screen layer and the ferromagnetic pinned layer, and it manifests an effect which lets the magnetization direction of the GMR-screen layer be arranged in one direction.

In an example which uses a typical synthetic ferromagnetic structure for the ferromagnetic pinned layer, the typical configuration of the present invention will be, from the substrate side, anti-ferromagnetic layer/first ferromagnetic pinned layer/anti-parallel coupling layer/second ferromagnetic pinned layer/separation-coupling layer/GMR-screen layer/non-magnetic intermediate layer/soft magnetic free layer. The aforementioned first ferromagnetic pinned layer and the second ferromagnetic pinned layer are the parts which function to arrange the magnetization direction of the GMR-screen layer, and they do not contribute materially to the GMR effect.

When a typical material of the GMR-screen layer is made of a precursor ferromagnetic metal material selected from any of Co, CoFe, or a Co alloy and an oxide thereof, an excellent GMR-screen layer is obtained. A structure with fine holes in the GMR-screen layer and a structure mixing an oxide and a ferromagnetic metal are fabricated by forming a precursor ferromagnetic metal layer on the separation-coupling layer, oxidizing an appropriate amount thereof, and annealing in an appropriate way after forming the non-magnetic intermediate layer and the soft magnetic free layer, etc. The GMR-screen layer, in both the oxide layer part and the ferromagnetic metal layer part, is formed with crystalline properties. Using such a structure, the crystalline continuity of the ferromagnetic pinned layer, the non-magnetic intermediate layer, and the soft magnetic free layer, which are stacked up and down through the GMR-screen layer, is maintained. That is, the crystal grain structure or crystal preferred orientation is kept continuous between the ferromagnetic pinned layer, the non-magnetic intermediate layer, and the soft magnetic free layer.

Magnetic coupling is generated between the GMR-screen layer and the ferromagnetic pinned layer through the separation-coupling layer, thereby, arranging the magnetization direction of the GMR-screen layer and letting the GMR effect appear efficiently.

According to the aforementioned technique, it is possible to achieve a CPP-GMR magnetic sensor having a GMR-screen layer in which both the current-path-confinement effect and the GMR effect are provided at the same time.

According to the present invention, high magnetoresistance and high output can be achieved by applying a structure using a GMR-screen layer, in which a current-path-confinement effect and a GMR effect appear at the same time in a CPP magnetoresistive layered film. In a magnetic recording/reproducing apparatus in which this is used for a read head, high recording density can be achieved, that is, a short recording wavelength while recording in a recording medium and recording with a narrow recording track width can be achieved, therefore, a sufficient output can be obtained and it is possible to keep the recording excellent.

BRIEF DESCRIPTION OF THE DRAWINGS

FIGS. 3(a)-(d) are drawings illustrating a manufacturing method of a GMR-screen layer of the present invention and a magnetoresistive layered structure using it.

FIGS. 5(a)-(c) are conceptual drawings illustrating GMR regions of the present invention and conventional structures.

DETAILED DESCRIPTION OF THE INVENTION

A thin film constituting a giant magnetoresistive layered film of the present invention was fabricated as follows by using a dc magnetron sputtering apparatus. The following materials were deposited in order on a ceramics substrate in an atmosphere with 0.2 to 0.3 mTorr of argon. Targets of tantalum, nickel-iron alloy, copper, CoFe, MnPt, and ruthenium were used for sputtering targets. The layered film was formed as follows. DC power was applied independently to each cathode where each target was placed to generate plasma in the chamber, and each layer was deposited in order by opening and closing the shutter arranged at each cathode, one by one.

While depositing the films, a magnetic field of about 80 Oersteds was applied parallel to the substrate by using permanent magnets, resulting in uni-axial anisotropy being obtained. The MnPt anti-ferromagnetic film was phase-transformed by annealing the deposited film in vacuum and in magnetic fields at 270° C. for three hours. The elements on the substrate were formed by patterning in a photo-lithography process. After that, the slider fabrication was applied to the substrate and it was mounted in a magnetic recording apparatus.

Embodiment 1

Figure 1:
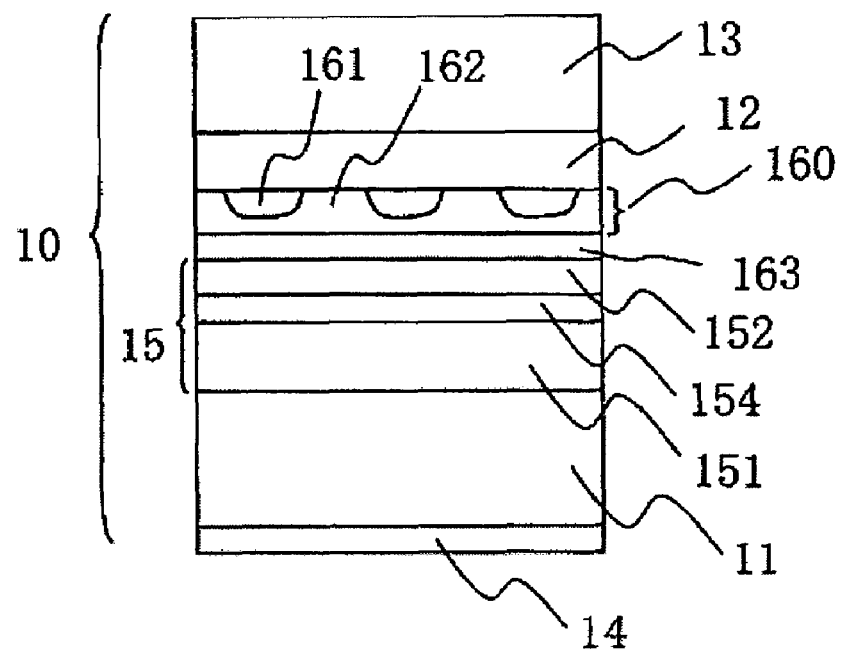
FIG. 1 is a drawing illustrating a layered structure of a typical magnetoresistive read sensor of the present invention.

FIG. 1 is a layered structure of a typical magnetoresistive read sensor of the present invention. A magnetoresistive layered film 10 is formed by stacking a soft magnetic free layer 13 and a GMR-screen layer 160 through a non-magnetic intermediate layer 12. The GMR-screen layer 160 has a spike-like ferromagnetic metal 162 and the spike-like ferromagnetic metal 162 is exposed or sticks out from the partial holes existing in an oxide layer 161. That is, the oxide layer 161 with holes covers a ferromagnetic metal layer underneath it, a part of the ferromagnetic metal layer fills in the hole parts of the oxide layer in a convex shape, is exposed and contacts the adjacent non-magnetic intermediate layer through the hole parts. According to this structure, the GMR screen layer 160 satisfies both the current-path-confinement effect, which limits the current-flow path of the current flowing in the film thickness direction, and, at the same time, the function for the spin-dependent scattering source which generates the GMR effect. The separation-coupling layer 163 contacts one side of the interface of the GMR-screen layer 160. This side of the interface is opposite the side of the interface which contacts the non-magnetic intermediate layer 12. The GMR-screen layer 160 is separated from the ferromagnetic pinned layer 15 by this separation-coupling layer 163, and the coverage ratio of the half-covering oxide layer 161 can be controlled to be an appropriate value.

The ferromagnetic pinned layer 15 consists of the first ferromagnetic pinned layer 151, the anti-parallel coupling layer 154, and the second ferromagnetic pinned layer 152, and, by exchanging coupling with the anti-ferromagnetic film 11, the magnetization is essentially pinned against the magnetic field which should be sensed. The magnetization of the GMR-screen layer 160 is pinned practically by the ferromagnetic coupling force through the separation-coupling layer 163.

Figure 2:
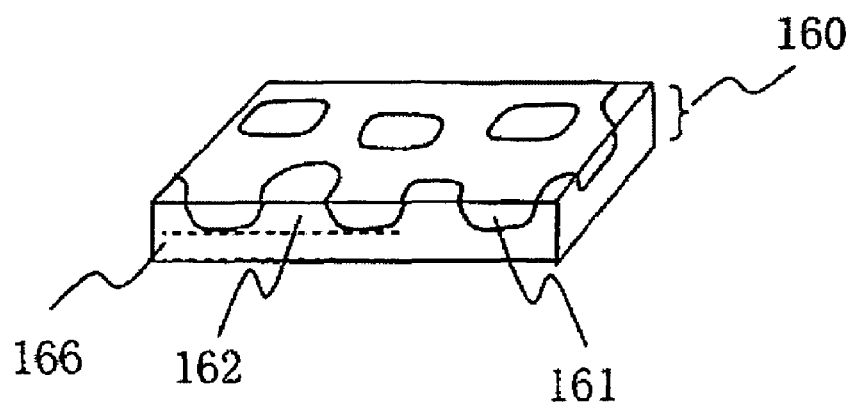
FIG. 2 is a drawing illustrating a detailed structure of a GMR-screen layer of the present invention.

FIG. 2 shows a detailed structure of a GMR-screen layer of the present invention. The GMR-screen layer consists of a composite of a ferromagnetic metal layer and an oxide layer with holes which covers the ferromagnetic metal layer. The ferromagnetic metal layer has parts which spike into the oxide layer thereon, that is, the spike-like ferromagnetic metal 162. The spike-like ferromagnetic metal 162 is exposed at the surface of the GMR-screen layer from the partial holes in the oxide layer 161. The oxide layer 161 half-covers the ferromagnetic metal layer underneath it, and lets the aforementioned spiked parts expose and stick out at the hole parts. The stick-like ferromagnetic metal 162 is one of the components of the ferromagnetic metal part which is continuously connected to the layered ferromagnetic metal part 166.

FIG. 3 shows a manufacturing method of a GMR-screen layer of the present invention and a manufacturing method of a magnetoresistive layered structure using it. As shown in (a) of FIG. 3, the underlayer 14, the anti-ferromagnetic film 11, the first ferromagnetic pinned layer 151, the anti-parallel coupling layer 154, and the second ferromagnetic pinned layer 152 are formed on a substrate, and the precursor ferromagnetic metal layer 167 is formed through the separation-coupling layer 163. Next, it is exposed to oxygen atmosphere in the same vacuum equipment. As shown in (b) of FIG. 3, by performing an oxidation process in an appropriate way, the precursor ferromagnetic metal layer 167 becomes a structure in which an oxidized crystalline oxide layer 165 is formed on the crystalline non-oxide layer 164 which is not oxidized. Next, as shown in (c) of FIG. 3, the non-magnetic intermediate layer 12, the soft magnetic free layer 13, and the protective/cap film 17 are formed as residual parts of the magnetoresistive layered film. The non-magnetic intermediate layer 12 and the soft magnetic free layer 13 are formed crystallographically continuously with the ferromagnetic pinned layer 15 through the crystalline oxidized layer 165 and the crystalline not-oxidized layer 164. Herein, crystallographic continuity means that the crystal grain structure defined by the crystal grain boundaries is continuous and it is an indirect epitaxial structure in which the crystal orientation in each of crystal grains is identical or possesses a special relationship in the film thickness direction. Details will be described in the explanation of FIG. 8. As shown in (d) of FIG. 3, by performing annealing on the layered structure formed in this manner, a composite in which the oxide layer with holes covers the ferromagnetic metal layer, that is, the spike-like ferromagnetic metal 162 and the half-covering oxide layer 161 having a predetermined coverage ratio can be obtained.

Figure 4:
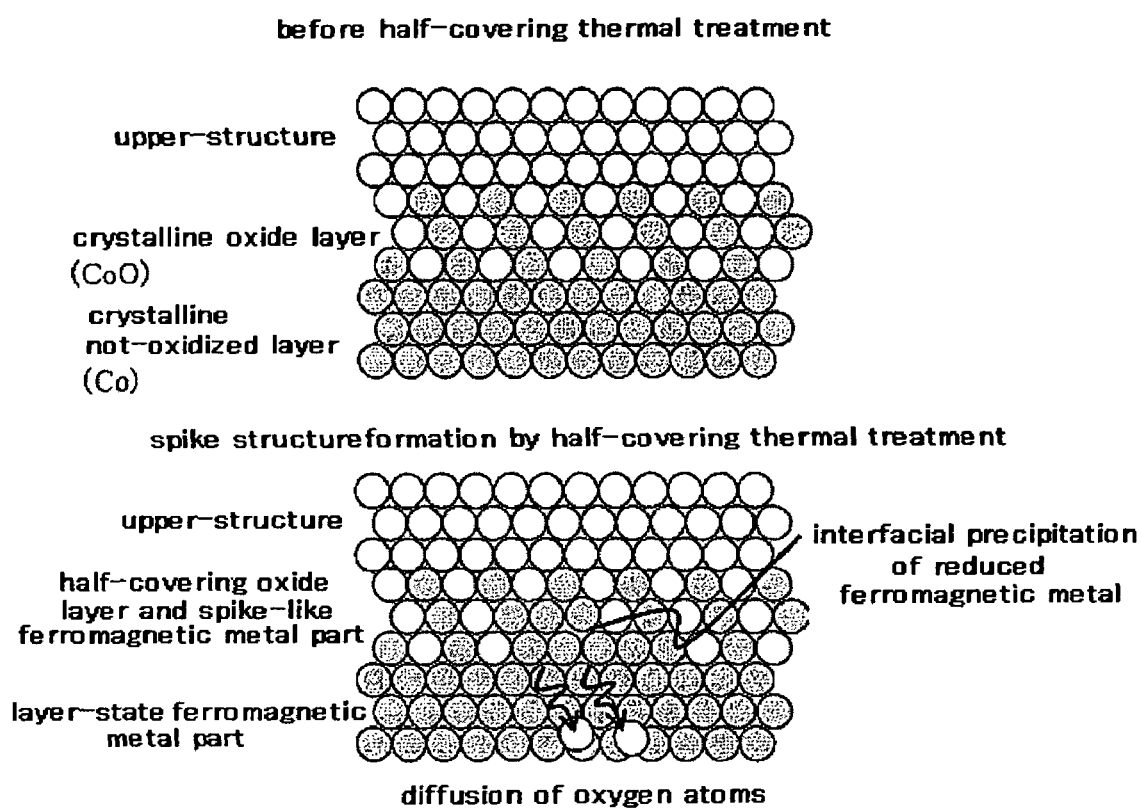
FIG. 4 is a drawing illustrating a formation process of a GMR-screen layer of the present invention.

A principle of forming this GMR-screen layer 160 will be described with reference to FIG. 4.

(1) Co is a metallic material to form a so-called passive surface which stops oxidation only at the surface when it is oxidized. Therefore, when Co or an alloy mainly composed of Co is formed as a precursor ferromagnetic layer and exposed to oxygen atmosphere, a crystalline oxidized layer with a predetermined thickness is formed at the surface, and the thickness of this oxide layer is relatively stable against the oxidation pressure and oxidation time and it is easy to control.

(2) The crystalline oxidized layer is epitaxial with the not-oxidized part (crystalline not-oxidized layer) of the underneath precursor ferromagnetic layer. When the non-magnetic intermediate layer and the soft magnetic free layer are stacked thereon (hereinafter, these parts are called the upper structure), the upper structure, the crystalline oxidized layer, and the crystalline not-oxidized layer have a structure which maintains an epitaxial relationship.

(3) When a half-covering heat treatment is carried out, oxygen diffuses from the crystalline oxidized layer into the upper structure and the crystalline not-oxidized layer to approach a thermally stable state. The partially reduced oxide becomes a ferromagnetic metal and is precipitated at the grain boundaries of the crystalline not-oxidized part (ferromagnetic metal) which has low surface energy.

(4) The speed of the reaction and the degree to which it progresses toward a thermal equilibrium state can be controlled by controlling the time and the temperature of the half-covering heat treatment, whereby, the GMR-screen layer having the half-covering oxide layer and the spike-like ferromagnetic metal part is formed.

Moreover, the separation-coupling layer 163 has an effect which promotes decomposition of the crystalline oxide layer 165 during the half-covering heat treatment. This is thought to be due to the thermal decomposition of the crystalline oxidized layer 165 which depends on a stress-driven restriction from the adjacent metal layer. When there is no separation-coupling layer 163, decomposition of the crystalline oxidized layer 165 by annealing is controlled by a strong restriction from the adjacent ferromagnetic pinned layer, resulting in the microstructure of the GMR-screen layer, that is, the structure of the spike-like ferromagnetic metal 162 and the half-covering oxide layer 161 not being formed as desired. Moreover, the separation-coupling layer 163 prevents oxygen from diffusing unnecessarily into the ferromagnetic pinned layer 15 and has the function of maintaining the stability of the ferromagnetic pinned layer 15 at a high level.

The features of using the manufacturing process of the present invention are as follows.

(1) As in the prior art, if the hole-shaped structure is formed while depositing, the structure being formed at the upper side of the hole-shaped structure becomes inhomogeneous because the hole-shaped structure is essentially an inhomogeneous structure in the plane of the film. That is, the roughness and inhomogeneity of the crystal preferred orientation (difference between the upper part of the hole and the upper part of the part not being a hole) are created in the structure of the non-magnetic intermediate layer or the soft magnetic free layer, so that adverse effects are generated such as deterioration of the soft magnetic characteristics. In a method of the present invention, there is no hole-shaped structure while depositing thin films, and a homogeneous non-magnetic intermediate layer and soft magnetic free layer can be obtained in the film plane.

(2) As in the prior art, the size of the holes and their number become inhomogeneous and unstable when one tries to make the hole-shaped structure while depositing the thin films, resulting in control being difficult. It is thought that distribution is principally created by fabrication of the microstructure by thin film deposition owing to the formation of the discontinuous structure. On the other hand, in a fabrication method of the present invention, formation is carried out in a homogeneous structure during the thin film deposition and oxidation process, and the ratio of the amounts of the metal and the oxide can be provided with thermal stability by the subsequent heat treatment. Therefore, a current-path-confinement effect can be obtained stably by using a manufacturing method of the present invention.

(3) Moreover, in the method of the present invention, the effect of increasing the chemical stability can be obtained by annealing after fabricating the non-magnetic intermediate layer and the soft magnetic free layer. In the case when the heat treatment is carried out at the point of the precursor layer only, the region where oxygen can diffuse is only the ferromagnetic pinned layer side, and both the non-magnetic intermediate layer and the soft magnetic layer fabricated subsequently are not affected by oxygen. Therefore, if a situation is created where oxygen diffuses in the subsequent processes, oxygen starts diffusing anew into the non-magnetic intermediate layer and the soft magnetic free layer, so that the characteristics of the magnetoresistive layered structure do not become stable. In the manufacturing method of the present invention, the magnetoresistive layered structure is formed before the half-covering heat treatment, and the non-magnetic intermediate layer and the soft magnetic free layer work beforehand as a part of the diffusion path of oxygen by annealing. Therefore, since the diffusion of oxygen is not promoted even if the temperature is increased or current flows, a constant current-path-confinement effect and stability of the magnetic characteristics of the soft magnetic free layer can be achieved.

Examples of concrete material used for the configuration of the layered film shown in FIGS. 1, 2, and 3 will be shown as follows. There is an under layer 14: Ni52Fe13Cr35 (5 nm), an anti-ferromagnetic film 11: Mn52Pt48(15 nm), a first ferromagnetic pinned layer 151: Co90Fe10 (3 nm), an antiparallel coupling layer 154: Ru (0.8 nm), a second ferromagnetic pinned layer 152: Co90Fe10 (2 nm), a separation-coupling layer 163: Cu (0.5 nm), a precursor ferromagnetic metal layer 167: Co90Fe10 (1.5 to 3 nm), a non-magnetic intermediate layer: Cu (2 nm), a soft magnetic free layer 13: Co90Fe10 (1 nm)/Ni80Fe20 (2 nm), a protective/cap layer Cu (1 nm)/Ru (5 nm).

FIG. 5 is conceptual drawings of GMR regions of the present invention and the prior art. (a) of FIG. 5 is a structure of the present invention. (b) of FIG. 5 shows a conventional structure 1 as a comparative example in which a current-screen layer is included in the non-magnetic intermediate layer, and (c) of FIG. 5 shows a conventional structure 2 as a comparative example in which a current-screen layer is included in the ferromagnetic pinned layer.

In the structure of the present invention, as shown in (a) of FIG. 5, the GMR-screen layer 160 and the soft magnetic free layer 13 are adjoined to each other separated merely by a distance of the thickness of the non-magnetic intermediate layer 12, therefore, the required migration length of electrons in the part where the GMR phenomenon is generated which generates the read signal is about the thickness of the non-magnetic intermediate layer 12. The thickness of the non-magnetic intermediate layer 12 can be made thin to keep the magnetic coupling between the soft magnetic free layer 13 and the GMR-screen layer 160 to be sufficiently small. The magnetic coupling between the soft magnetic free layer 13 and the GMR screen layer 160 can be made almost zero, even if it is concretely made as thin as about 2 nm. Since the GMR effect is an exchange of the electron spin information between the two layers which are the GMR region, the configuration of the present invention can make the GMR effect larger.

When the GMR region of the conventional structure 1 shown in (b) of FIG. 5 is similarly seen for the sake of comparison, there is a non-magnetic intermediate layer, which is one where a current screen layer is sandwiched between the soft magnetic free layer and the ferromagnetic pinned layer, where the spin information is exchanged. In the conventional structure 1, the total thickness of the non-magnetic intermediate layer becomes thicker by sandwiching the current screen layer, and the distance required to exchange the spin information becomes larger.

It is the same in the conventional structure 2 shown in (c) of FIG. 5 in which a current-screen layer is sandwiched in the ferromagnetic pinned layer. Since the current-path-confinement enlarges the contribution to the adjacent electrical resistance, in the GMR region of the conventional structure 2, one only has to think about the distance between the soft magnetic free layer and the current screen layer surrounding area in the ferromagnetic pinned layer. Exchange of the spin data is carried out in the distance only of the sum total of thicknesses of the non-magnetic intermediate layer and a part of the ferromagnetic pinned layer.

According to such a theory, it can be understood that the effect of increasing the MR ratio by using a structure of the present invention is high compared with a conventional structure.

Figure 6:
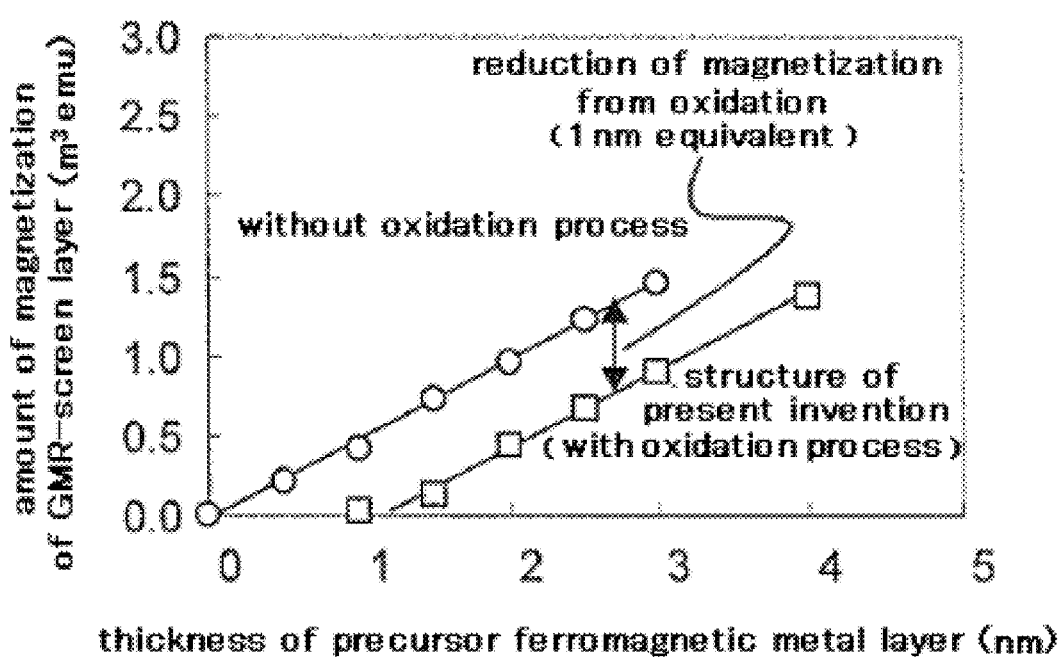
FIG. 6 is a diagram showing the amount of magnetization of a GMR-screen layer in a magnetoresistive layered structure in the case when the thickness of a precursor ferromagnetic metal layer is varied.

FIG. 6 shows the change in the amount of the magnetization of a GMR-screen layer in a magnetoresistive layered structure in the case of the film thickness of the precursor ferromagnetic metal layer being changed. Herein, the amount of the magnetization of the GMR-screen layer is the value where the amounts of magnetization of the soft magnetic free layer and the ferromagnetic pinned layer are subtracted from the total amount of magnetization after fabricating the magnetoresistive layered structure. As a comparison, the amount of the magnetization in the case when an oxidation process is not carried out is also shown.

The amount of the magnetization of the GMR-screen layer (no oxidation process) increases linearly, passing through the origin, in proportion with the thickness of the precursor ferromagnetic metal layer. In the case of the GMR-screen layer (oxidation process being applied) the magnetization of the GMR-screen layer is zero when the thickness of the precursor ferromagnetic metal layer is 1 nm, and it is understood that the 1 nm thick precursor ferromagnetic metal layer is entirely oxidized. When the precursor ferromagnetic metal layer is made even thicker, the magnetization increased showing the linear relationship having the same inclination as the case where there was no oxidation process. As a result, by using the manufacturing method shown in FIG. 3 of the present invention, the precursor ferromagnetic metal layer is oxidized only about 1 nm and is maintained in the state of ferromagnetic metal to form the GMR-screen layer.

Figure 7:
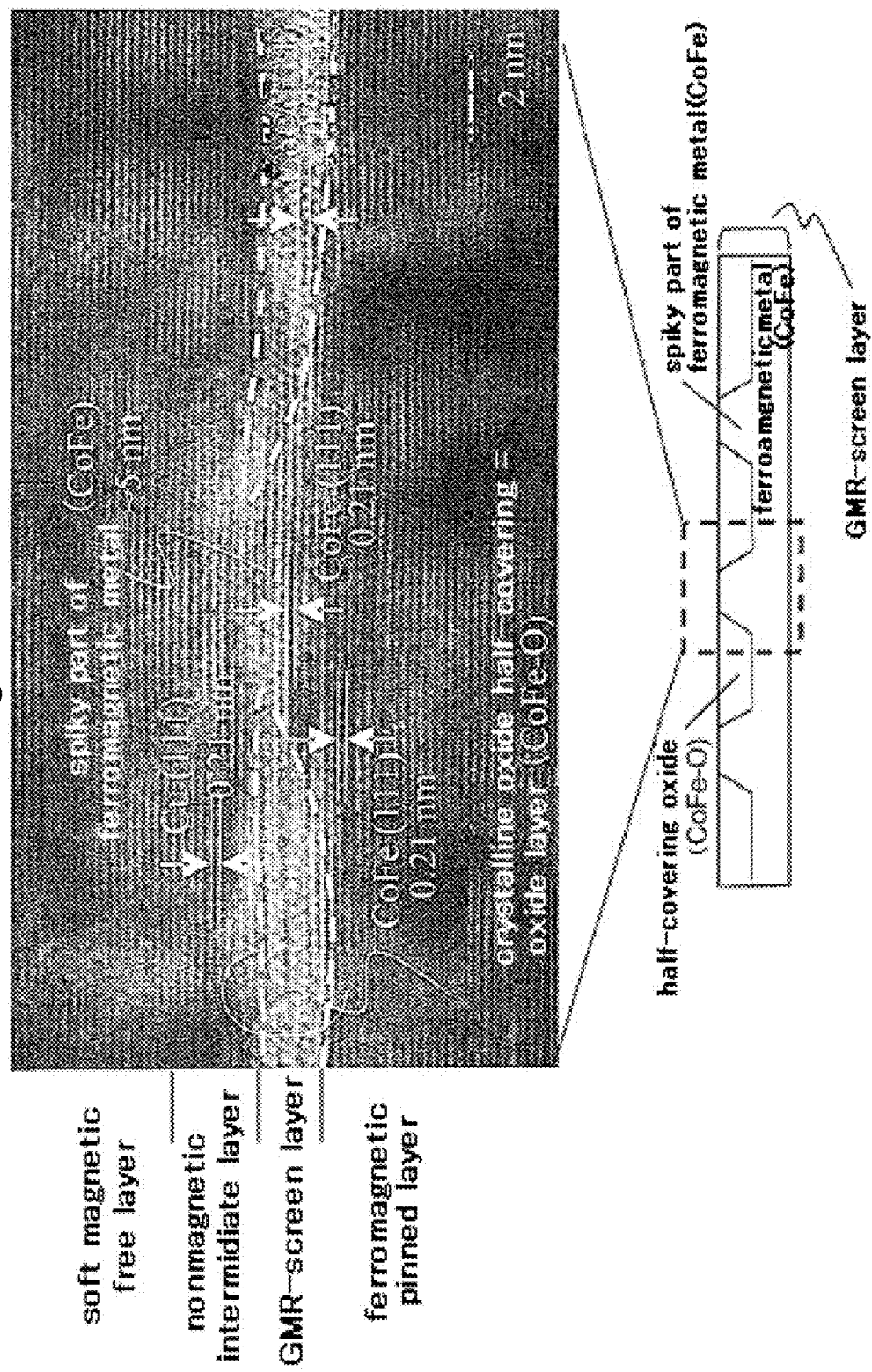
FIG. 7 is a TEM image in which a GMR-screen layer of the present invention was observed.

FIG. 7 is a TEM image observing a GMR-screen layer of the present invention. Although it is very difficult to observe experimentally the structure, such as the structure of the present invention, which has locally mixed sections on an extremely thin plane, a structural image of the GMR-screen layer of the present invention could be observed as a result of diligent observation.

In the cross-sectional observation image shown in FIG. 7, the crystal lattice is observed in the entire observed area, and it is understood that the magnetoresistive layered structure of the present invention has excellent crystal preferred orientation. The structure of each part observed in FIG. 7 can be understood by measuring the lattice spacing of the lattice image observed in FIG. 7 and comparing it with the layered structure design. The lattice spacing of 0.25 nm is almost identical with the lattice spacing of oxide that CoO is a representative, so that it is understood that this part is a crystalline oxide composed of Co—O or CoFe—O. It is understood that this region of the crystalline oxide, that is, a so-called half-covering oxide layer structure of the present invention, is extended in almost a layered shape as shown in the dotted line in FIG. 7 and has "holes" partially. Parts of these holes are also crystalline and the lattice spacing is 0.21 nm which is identical to the CoFe (111) plane, and corresponds to the parts maintaining the state of the ferromagnetic metal in the GMR-screen layer described in the explanation of FIG. 6. The upper and lower layers of this GMR screen layer are the non-magnetic intermediate layer (Cu) and the ferromagnetic pinned layer (CoFe), respectively.

From the aforementioned results, it is thought that the GMR-screen layer of the present invention has a structure like the schematic drawing shown at the bottom of FIG. 7. A part of about 1 nm in the precursor ferromagnetic metal layer becomes a crystalline oxide and becomes a half-covering oxide layer which half-covers the part not in an oxidized state. The ferromagnetic metal not in an oxidized state consists of the layer-structured part and the spike-like ferromagnetic metal which sticks in the half-covering oxide.

Figure 8:
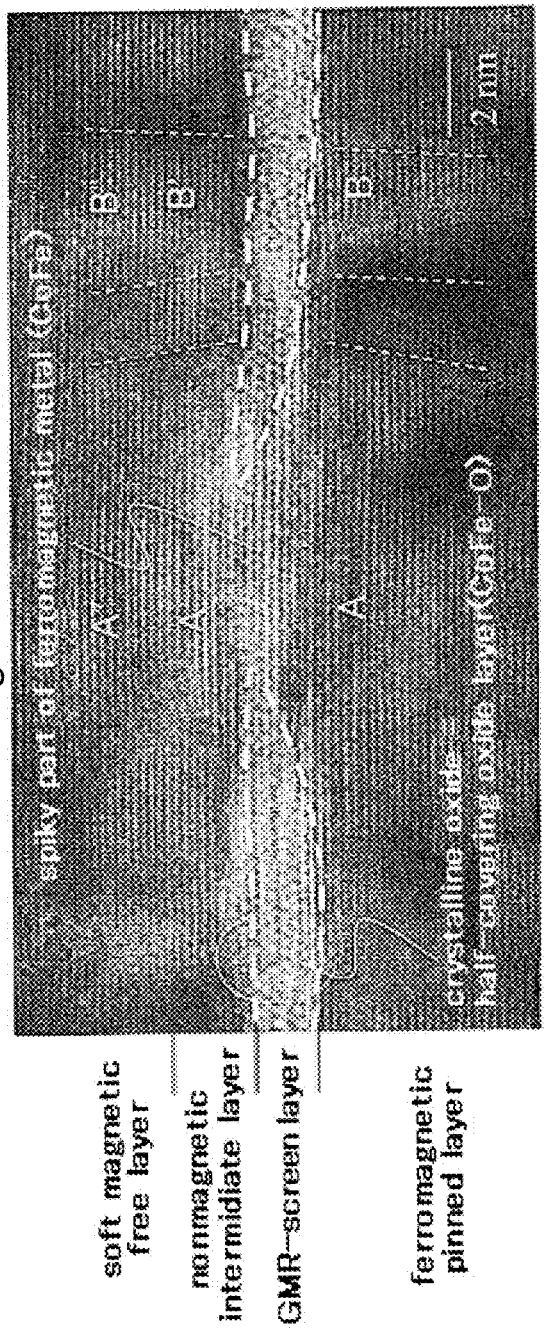
FIG. 8 is a TEM image in which a GMR-screen layer of the present invention was observed with attention paid to the crystalline structure.

Moreover, when attention is paid to the crystalline state of the upper and lower layered parts of the GMR-screen layer, an epitaxial relation can be observed. FIG. 8 is an image of a TEM image, the same as FIG. 7, when attention is paid to the crystalline states of the ferromagnetic pinned layer, the non-magnetic intermediate layer, and the soft magnetic free layer. As shown in both A and A' in FIG. 8, the lattice images of the strongly oriented (111) plane is observed in the ferromagnetic pinned layer and the non-magnetic intermediate layer, so that it is understood that they are continuously connected through the spike-like ferromagnetic metal. The soft magnetic free layer also has a continuous crystal structure with the non-magnetic intermediate layer (A"). Although the parts shown as B and B' are connected through the half-covering oxide layer, B, B', and B", also similar to this case, exhibit lattice images of a strongly oriented (111) plane, so that it is understood that B, B', and B" keep a crystallographically identical relation. Moreover, the crystal grain boundaries in the vicinity of B, B', and B" are shown in the dotted line in the figure, and the spatial relation of the crystal grain boundaries is identical in the ferromagnetic pinned layer and both of the non-magnetic intermediate layer and the soft magnetic free layer which are above and below through the half-covering oxide layer.

As mentioned above, the magnetoresistive layered structure of the present invention is formed while maintaining crystalline continuity both above and below through the GMR-screen layer. This is the same in the part of the spike-like ferromagnetic metal and the part of the half-covering oxide layer in the GMR-screen layer, resulting in being able to maintain the crystallinity of the soft magnetic free layer at a high level. Since the magnetic characteristics of the soft magnetic free layer can be maintained very well and the crystalline stability of the GMR-screen layer enhanced by the continuity with the upper and lower films, the GMR-screen layer of the present invention can demonstrate high long-term reliability.

Figure 9:
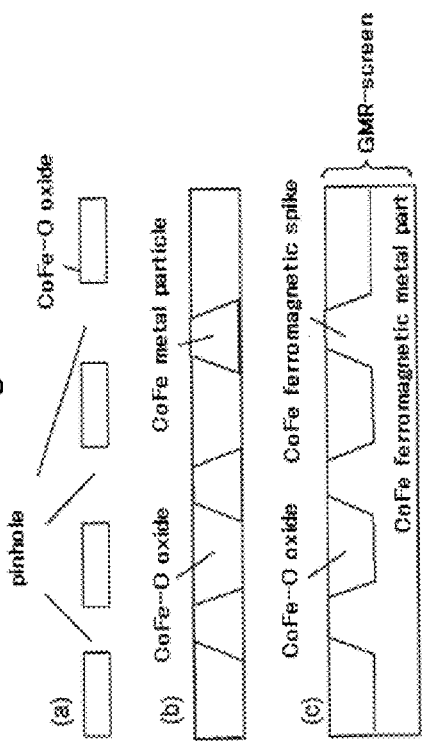
FIG. 9 is a conceptual drawing of the thickness and the structure of a precursor ferromagnetic metal layer.

FIG. 9 is conceptual drawings of the thickness and structure of a precursor ferromagnetic metal layer. This structure is a structure after the heat treatment process shown in FIG. 3. In the case when the thickness of the precursor ferromagnetic metal layer is thin (FIG. 9($a$)), it becomes a structure where the entire precursor ferromagnetic metal layer becomes an oxidized film as understood from the amount of the magnetization shown in FIG. 6. This oxidized film has tiny pinholes, so that current confinement is possible but the GMR effect cannot be observed at this part because it does not have the ferromagnetic metal part. The GMR effect observed in this structure is a GMR effect which is created between the soft magnetic free layer and the ferromagnetic pinned layer passing through the aforementioned oxide layer, resulting in not being able to obtain a high MR ratio because of the long distance between them. When the precursor ferromagnetic metal layer is made thicker, the structure of the magnetoresistive layered structure after annealing becomes one in which both oxide and ferromagnetic metal particles coexist as shown in (b) of FIG. 9. In this structure, a GMR effect can exist because of the existence of ferromagnetic metal particles, but, since the volume and the thickness of the ferromagnetic metal particles are small, the scattering probability of electrons is small in addition to instability of the magnetization.

The structure of a GMR-screen layer of the present invention shown in (c) of FIG. 9 is fabricated by forming the precursor ferromagnetic metal layer even thicker and carrying out an appropriate oxidation treatment, stacking treatment, and annealing. A current-path-confinement effect is obtained by the crystalline oxide and, in addition, a high GMR effect appears, caused by sticking out the ferromagnetic spiking part out of the non-covering part of the crystalline oxide. Furthermore, the ferromagnetic metal anchors the spiking parts in a layered shape to increase the volume of the ferromagnetic metal, resulting in both magnetic stability and a high scattering effect being achieved. As a result, the GMR-screen layer of the present invention can exchange the spin information of electrons efficiently with the soft magnetic free layer, resulting in a high MR ratio appearing. In the structures shown in (a) and (b) of FIG. 9, a GMR effect is created by exchanging the spin information between the soft magnetic free layer and the ferromagnetic pinned layer, and, on the other hand, a GMR effect is created between the GMR-screen layer and the soft magnetic free layer in the present invention. Using a thick precursor ferromagnetic metal layer for formation of the GMR-screen layer has the effect of improving the current-path-confinement effect, so that it will be described separately later with reference to FIGS. 10 and 11.

Figure 10:
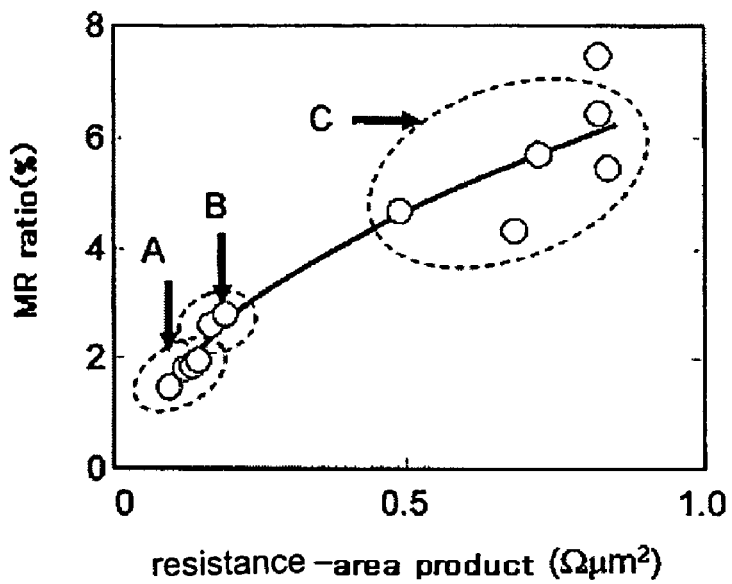
FIG. 10 is a diagram showing the relationship between the resistance-area product RA and the MR ratio (resistance-change ratio) of a CPP-GMR element when a GMR-screen layer is used.

FIG. 10 is a diagram which shows the relationship between the resistance-area product RA and the MR ratio (resistance change ratio) of a CPP-GMR element for the case when a GMR-screen layer is used. A, B, and C in the figure correspond respectively to (a), (b), and (c) of FIG. 9, and the thicknesses of the precursor ferromagnetic layers are 0.8 to 1.2 nm, 1.2 to 1.5 nm, and 1.5 to 4 nm, respectively. With the elements of group A having thicknesses in which the precursor ferromagnetic metal layer becomes entirely oxide, the obtained MR ratio was about 1.5 to 2%. With the elements of group B including metallic fine particles in the precursor ferromagnetic metal layer, the MR ratio increased slightly but it was 3% or less. With the elements of group C having a structure of the GMR-screen layer of the present invention, the MR ratio was improved to 4 to 7% or more. In this way, it is understood that the structure of the GMR-screen layer is effective in improving the MR ratio.

Herein, attention is paid to the value of resistance-area product RA shown in FIG. 10. The resistance-area product RA is less than $0.1\ \Omega\mu m^2$ in group A and this value is as low as about 1.5 times the value when the current-path-confinement effect is not used, so that it is understood that the current-path-confinement effect in group A is considerably weak. In group B, the current-path-confinement effect is increased to let the resistance-area product RA be about $0.2\ \Omega\mu m^2$, and, moreover, even larger resistance-area products from 0.5 to $0.8\ \Omega\mu m^2$ were obtained in group C. It is desirable that the resistance-area product be about 0.2 to $1\ \Omega\mu m^2$, so that it is understood that group C has desirable characteristics. On the other hand, it is understood that the current-path-confinement effects are different in the three groups. Since the amount of oxide formed is almost constant no matter what the thickness of the precursor ferromagnetic layer is as shown in FIG. 6, it is thought that this difference is caused by differences in the configuration, that is, the size and the number of the holes due to changes in the thickness of the precursor layer. Although the detailed mechanism is not clear, the progress of getting non-covered by decomposition of the oxide while annealing may be different in the three configurations shown in FIG. 9, and it is thought that the more the ferromagnetic metal layers being adjoined, the greater the effect of suppressing the progress of being non-covered.

Figure 11:
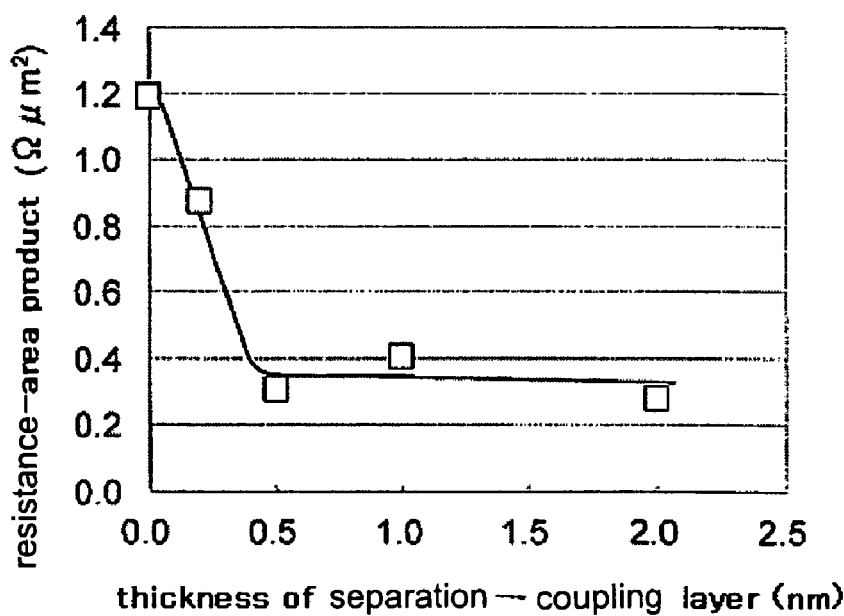
FIG. 11 is a diagram showing the relationship between the thickness and the resistance-area product of a separation-coupling layer.

The same resistance-area product control effect was observed in the separation-coupling layer. FIG. 11 shows the relationship between the thickness of the separation-coupling layer and the resistance-area product. In the case when the thickness of the separation-coupling layer is zero, that is, the separation-coupling layer is not used, the resistance-area product becomes greater than $1\ \Omega\mu m^2$, and such a high resistance-area product is not preferable because the distribution of the element characteristics and the frequency of destruction from ESD are increased in addition to an increase in the noise in the application to the magnetic head. The resistance-area product decreases slightly when a 0.2 nm thick separation-coupling layer is introduced, but it is $0.8\ \Omega\mu m^2$ or more. When the separation-coupling layer is 0.5 nm or more, the resistance-area product decreases to 0.3 to $0.4\ \Omega\mu m^2$, and it is understood that a preferable value for application can be obtained. The effect is low because a 0.2 nm thickness of the separation-coupling layer is on the thickness of an atomic monolayer and it is difficult to form a continuous film, and it is thought that the separation-coupling layer works as a continuous layer when it is made greater than about 0.5 nm. As a result, it is thought that the function of the separation-coupling layer is physically to separate the precursor ferromagnetic metal layer from the ferromagnetic pinned layer when the precursor ferromagnetic metal layer is formed to be a predetermined thickness and the GMR-screen layer is formed in a desired configuration by using the fabrication method shown in FIG. 3. Both the ferromagnetic pinned layer and the precursor ferromagnetic metal layer are composed of ferromagnetic metallic elements, therefore, they have similar element compositions. For the ferromagnetic elements used for such a magnetic head application field is limited to three elements of Fe, Co, and Ni. Specifically, in this embodiment, the same CoFe based alloy is used and it has a great advantage for the fabrication of thin films.

In the case when there is no separation-coupling or it is too thin to function, the precursor ferromagnetic layer directly contacts the second ferromagnetic pinned layer, specifically as it was explained using the structure of FIG. 1. This brings an effect which is similar to the precursor ferromagnetic metal layer being thick. As shown in FIG. 10, it is experimentally known that the current-path-confinement effect becomes extremely high by the formed oxide when the thickness of the precursor ferromagnetic layer becomes thick, so that the extremely high resistance-area product is a disadvantage in application. Therefore, we found that the separation-coupling layer has a function to control the resistance-area product to be an appropriate value by refusing physical contact between the precursor ferromagnetic metal layer and the ferromagnetic pinned layer.

Figure 12:
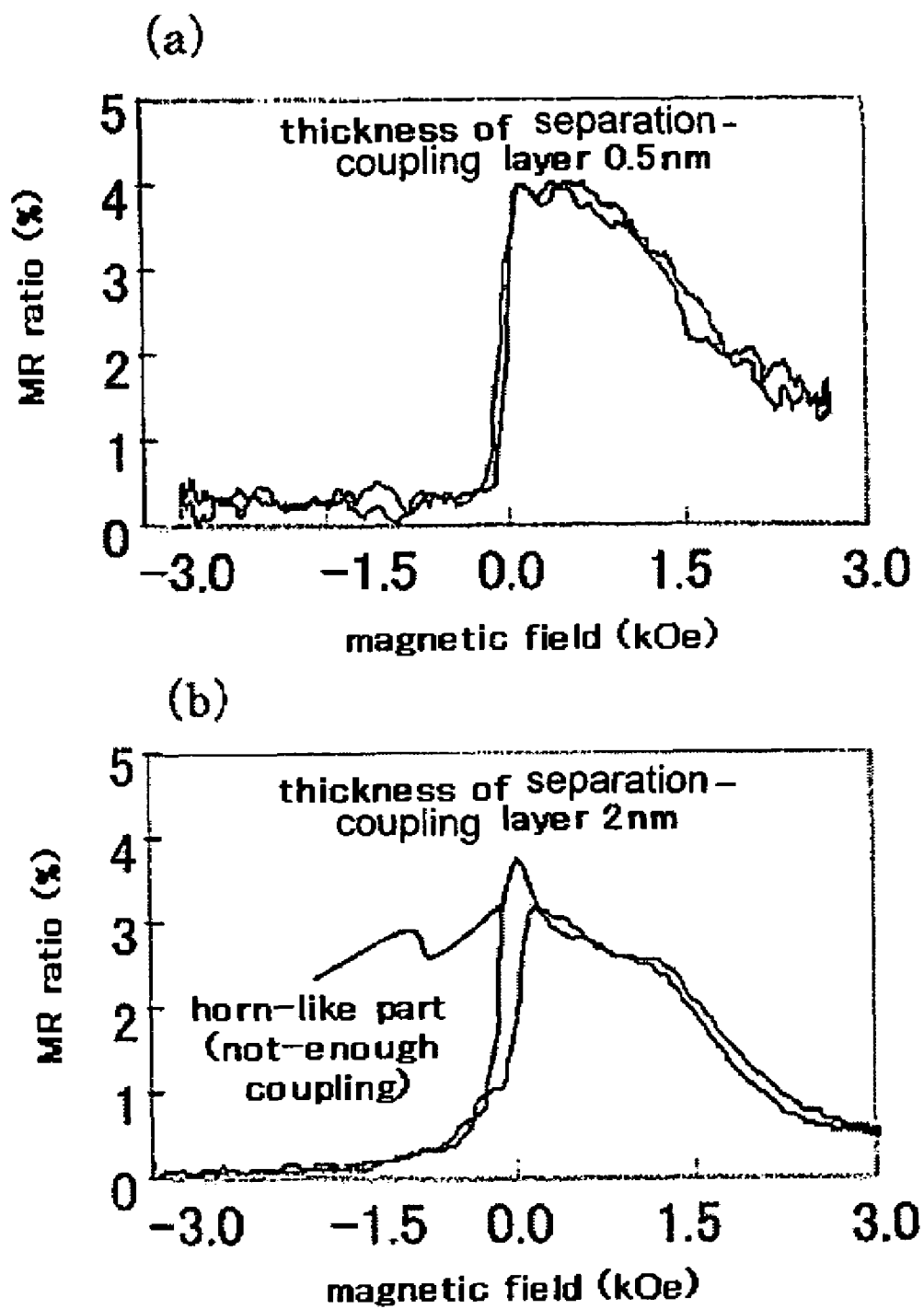
FIGS. 12(a)-(b) are diagrams showing an MR curve when the thickness of a separation-coupling layer is controlled to be 0.5 nm which is an appropriate value and an MR-curve when the thickness is controlled to be 2 nm as a comparison.

A second function of the separation-coupling layer will be described as follows. An MR curve is shown in (a) of FIG. 12 in the case when the thickness of the separation-coupling layer is controlled to be an appropriate value of 0.5 nm and an MR curve shown in (b) of FIG. 12 is the case when the thickness is controlled to be 2 nm as a comparison. The thickness in which the separation-coupling layer functions normally is from 0.5 nm to 1.5 nm, and the MR curve in this region shows a normal spin-valve operation as shown in (a) of FIG. 12. That is, the MR ratio changes in step functionally in the vicinity of zero magnetic field and it has flat regions on both the positive and negative sides. This appears to be due to the separation-coupling layer having a function which lets the ferromagnetic pinned layer and the GMR-screen layer couple magnetically and, because of this, the magnetization of the GMR-screen layer is practically pinned to the external magnetic field. On the other hand, in the case when the thickness of the separation-coupling layer is 2 nm, it is understood that a horn-like transition region appears as shown in (b) of FIG. 12 and the shape of the MR curve as a spin-valve is ruined. Such a horn-like part does not contribute to the output in an application such as a magnetic head, so that it does not function practically as an MR ratio. This horn-like part is caused by the magnetization of the GMR-screen layer operating against an external magnetic field. That is, the second function of the separation-coupling layer is letting the GMR-screen layer magnetically couple to the ferromagnetic pinned layer.

Figure 13:
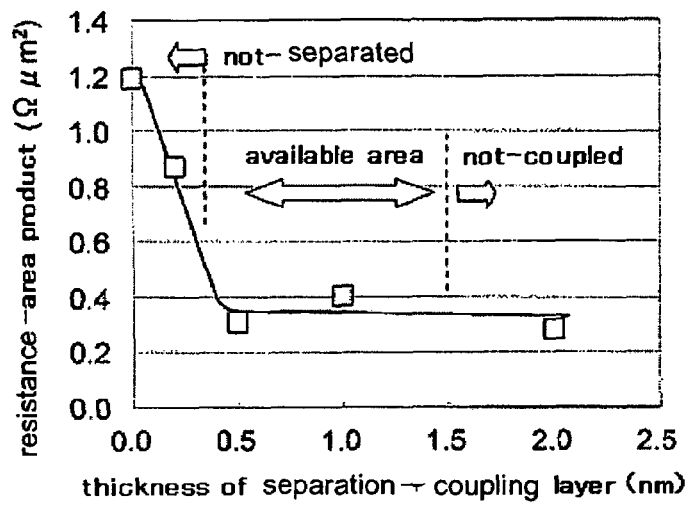
FIG. 13 is a diagram showing the appropriate thickness region of a separation-coupling layer.

FIG. 13 shows a range of the appropriate thicknesses of the separation-coupling layer. According to the results shown in FIG. 12, the controlling effect of the resistance-area product can be observed when the thickness of the separation-coupling is controlled to be 0.3 nm or less. Moreover, when the thickness of the separation-coupling layer is controlled to be 1.5 nm or more, magnetic coupling cannot be maintained. As a result, the appropriate thickness of the separation-coupling layer is from about 0.3 nm to about 1.5 nm.

Figure 14:
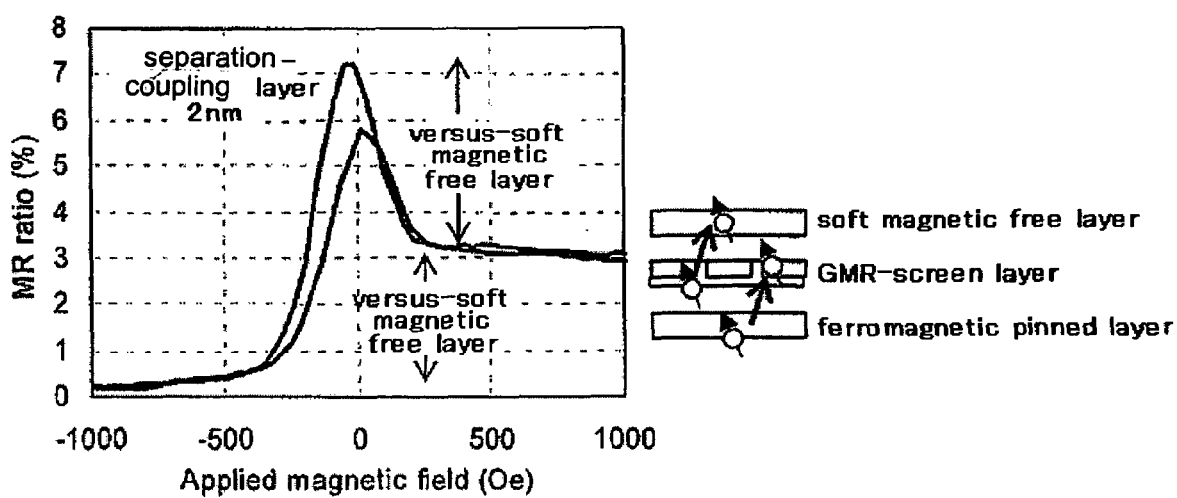
FIG. 14 is a diagram which experimentally shows the GMR effect of a GMR-screen layer of the present invention.

Herein, in order to explain the physical meaning of the present invention, the function of a GMR-screen layer will be explained by using an example in the case when the thickness of the separation-coupling layer is not suitable. FIG. 14 is an example in the case when the thickness of the separation-coupling layer is controlled to be 2 nm. The same as in (b) of FIG. 12, a clear horn-like peak can be observed. This is a case when magnetization rotation occurred in the GMR-screen layer against the external magnetic fields because the separation-coupling layer is thicker than the appropriate thickness, therefore, the contribution of the GMR-screen layer to the GMR effect can be clearly understood. A drawing for a theoretical explanation is shown at the right side of FIG. 14. From the result that the GMR-screen layer functions as one magnetic layer, it is understood that there are two combinations where the GMR effect appears, which are the gap between the GMR-screen layer and the ferromagnetic pinned layer and the gap between the MR-screen layer and the soft magnetic free layer. In the graph of FIG. 14, the GMR effect being created in the gap between the GMR-screen layer and the ferromagnetic pinned layer, and the GMR effect being created in the gap between the GMR-screen layer and soft magnetic free layer are observed at the same time. It is clearly understood from this result that the GMR-screen layer of the present invention is not only a current screen layer but also shows a high GMR effect.

Figure 15:
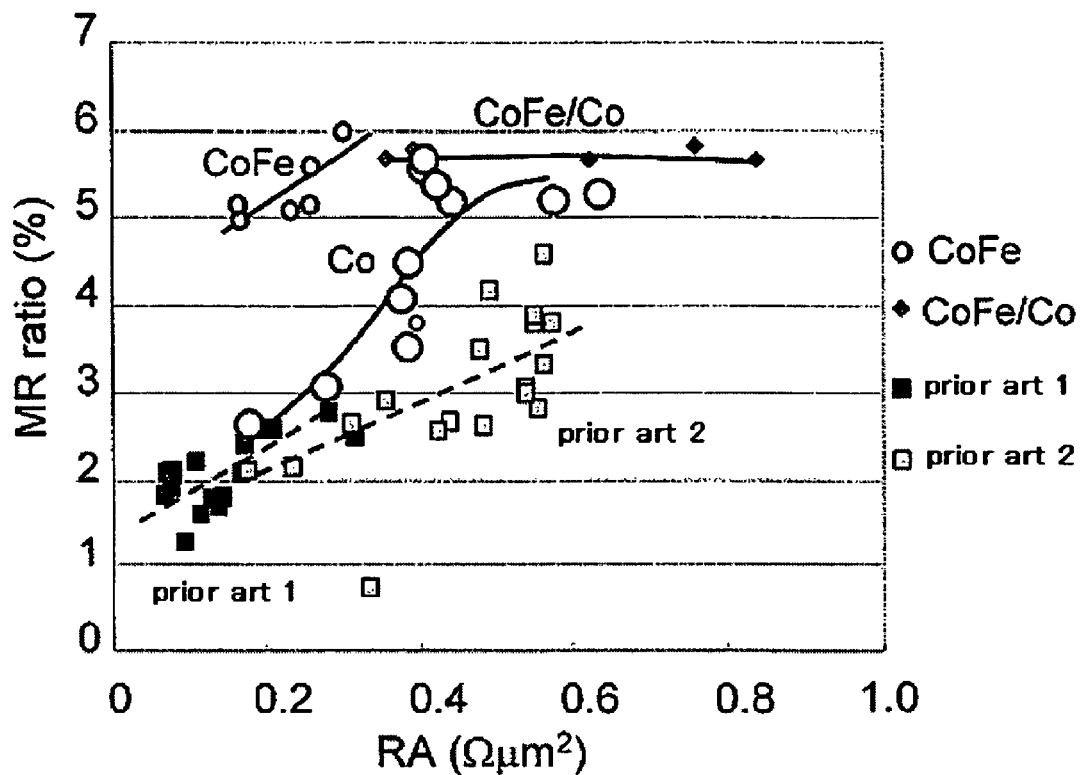
FIG. 15 is a diagram showing the experimental results of the structure and the compositions of a GMR-screen layer of the present invention.

FIG. 15 shows the results of changing the material for the precursor ferromagnetic metal layer. As a comparison, examples of the prior art when a Co90Fe10 precursor ferromagnetic metal layer was used are also shown. Herein, the conventional techniques 1 and 2 correspond to the conventional structures 1 and 2 described in FIG. 5. The results where the MR ratio was from 1 to 3% were obtained in the conventional structures. On the other hand, in the structure of the present invention, the MR ratio of from 5 to 6% was obtained in the low resistance-area product RA region (0.2 $\Omega\mu m^2$ or less) when the precursor ferromagnetic metal layer was composed of the same Co90Fe10. Therefore, it is understood that excellent characteristics for a magnetic head are obtained in the GMR-screen layer structure of the present invention. Next, seeing the case when Co is used for the precursor ferromagnetic metal layer, it is understood that an MR ratio of 5% or more can be obtained, even if Co is used. Moreover, the case when a Co/CoFe layered film is used for the precursor ferromagnetic metal film is shown. Stable high values of the MR ratio, from 5 to 6%, were obtained. As mentioned above, as a result of having experimented with the effects of the structure of present invention, high MR ratios could be obtained in alloys mainly composed of Co.

Figure 16:
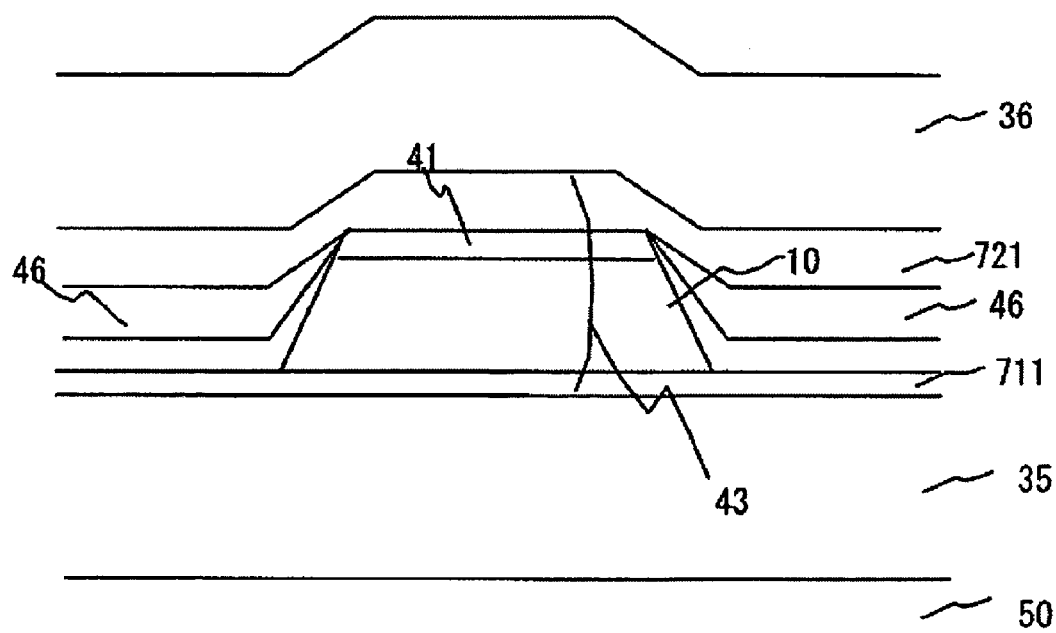
FIG. 16 is a drawing illustrating a structural example of a magnetoresistive magnetic head.

FIG. 16 is a conceptual drawing illustrating a read head in which a magnetoresistive element using a magnetoresistive layered film of the present invention is equipped. It is a drawing seen from the air bearing surface against a magnetic recording medium. It consists of a lower magnetic shield-cum-electrode 35, a lower conductive gap 711, a magnetoresistive layered film 10, a conductive cap layer 41, an upper conductive gap 721, an upper magnetic shield-cum-electrode 36 formed on a substrate 50 which doubles as a slider. The high-coercivity bias film 46 is placed on both sides of the magnetoresistive layered film 10 to give a domain stabilization effect. If a structure, in addition to the structure described in this figure, is used in order to achieve the domain stabilization effect, the feature of the present invention is not ruined. The read gap 43 is defined at a gap between the upper magnetic shield-cum-electrode 36 and the lower magnetic shield-cum-electrode 35, and is formed by providing the magnetoresistive layered film 10 between them.

Figure 17:
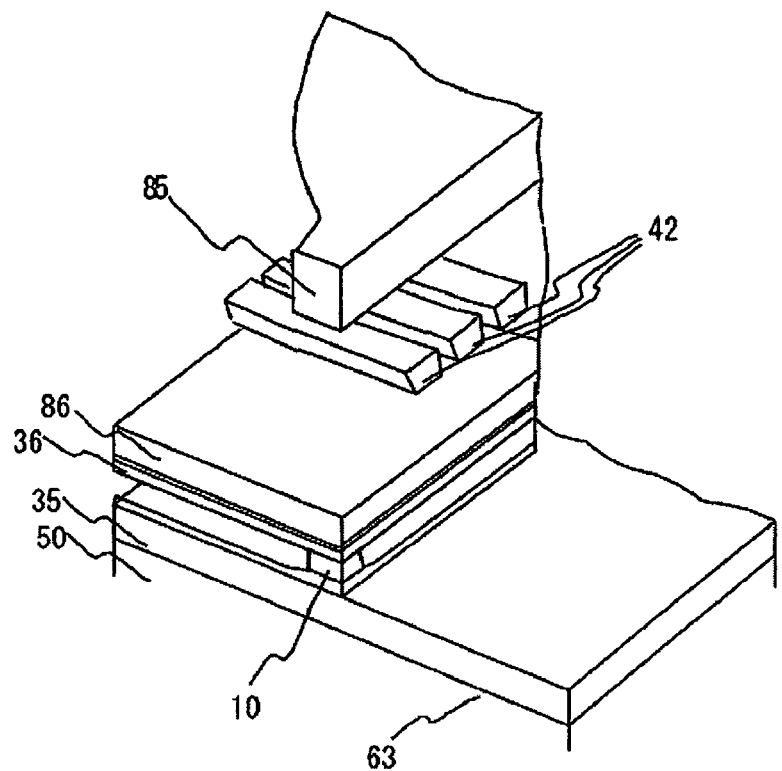
FIG. 17 is a drawing illustrating a structural example of a recording/reproducing separation type magnetic head for perpendicular recording.

FIG. 17 is a conceptual drawing illustrating a recording/reproducing separation type magnetic head for perpendicular recording in which a magnetoresistive element of the present invention is mounted. It consists of a magnetoresistive layered film 10, a lower magnetic shield-cum-electrode 35, an upper magnetic shield-cum-electrode 36, an return magnetic pole 86, a coil 42, and a main magnetic pole 85 formed on a substrate, which also doubles as a slider, and an air bearing surface 63 formed opposite to a recording medium. It is preferable to provide a domain stabilization structure corresponding to a high-coercivity bias film 46 shown in FIG. 16, but a description is omitted in this figure. Since a magnetic head of the present invention is one which improves the ability of a read part, it is a technology which can be applied to both perpendicular recording and conventional longitudinal recording. However, a more effective function can be achieved by combining it with a perpendicular magnetic recording head.

Figure 18:
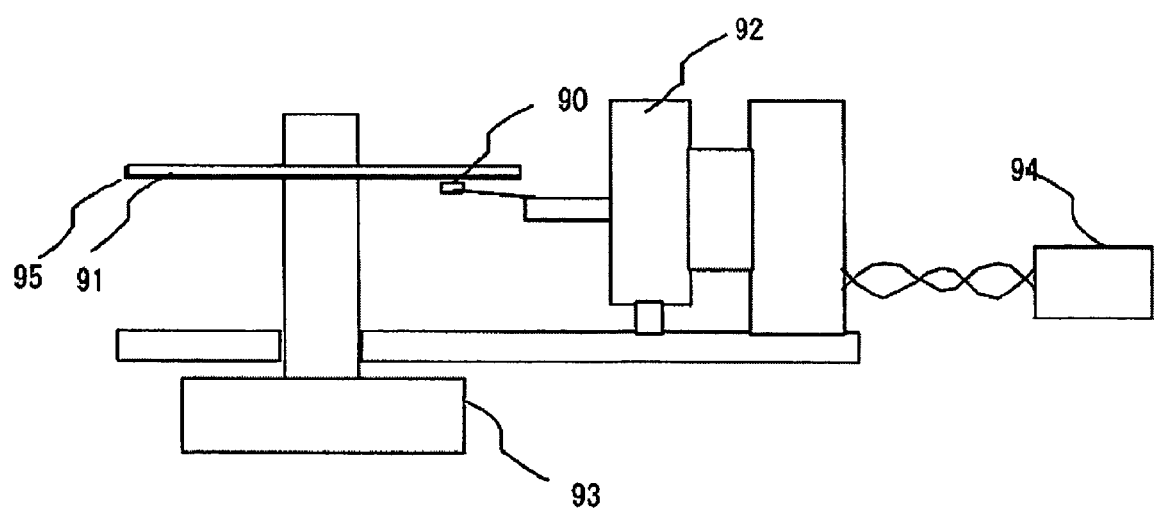
FIG. 18 is a drawing illustrating a structural example of a magnetic recording/reproducing apparatus.

FIG. 18 is a structural example of a magnetic recording/reproducing apparatus using a magnetic head of the present invention. A disk 95 holding a recording medium 91 where information is magnetically recorded is rotated by a spindle motor 93, and a head slider 90 is guided onto the track of a disk 95 by an actuator 92. That is, in the magnetic disk, the read head formed on the head slider 90 and the write head move relatively and approach a predetermined recording position on the disk 95 according to this mechanism, and write and read the signals, in order. The actuator 92 is preferably a rotary actuator. The write signal is recorded on the medium by the write head through the signal processing system 94, and the output of the read head is received as a signal through the signal processing system 94. Moreover, when the read head is allowed to move on the recording track, the position on the track is detected by using the highly sensitive output from this read head, and by controlling the actuator, positioning of the head slider can be carried out. In this figure, one each of the head slider 90 and the disk 95 is shown, but there may also be a plurality of each. Moreover, the disk 95 may have the recording medium 91 on both sides of it to record information. In the case when information is recorded on both sides of the disk, the head slider 90 is arranged on both sides of the disk.

Figure 19:
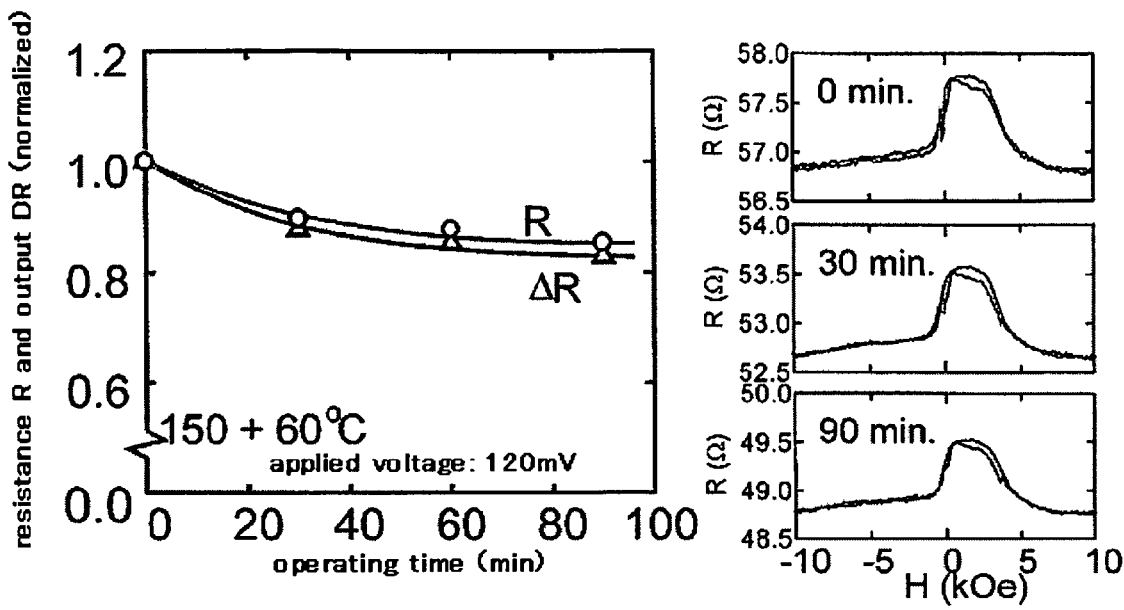
FIG. 19 is diagram showing illustrating an example of the results of a high temperature acceleration test of a magnetoresistive magnetic head of the present invention.

As a result of tests of a magnetic head of the present invention and a magnetic recording/reproducing apparatus using it in the configuration described above, sufficient output, excellent bias characteristics, and excellent operation reliability were obtained. Specifically, as a result of long time operation tests applying a predetermined voltage, excellent operation lifetime was obtained in the magnetic head of the present invention. FIG. 19 shows the results of an acceleration test which was carried out on a magnetic head of the present invention in a high temperature environment. When an applied voltage of 120 mV was applied to the magnetic head at an environmental temperature of 150° C., the temperature increase due to self-heating of the magnetic head was about 60° C. When a long time operation test was carried out under these conditions, a decrease in the resistance R and a decrease in the resistance-change ΔR corresponding to the output were observed at the end of each operating time (left figure of FIG. 19). A change in shape in the MR curve of the magnetic head was not observed before the operation test and after the 30 min. and 90 min. tests, so that it is understood that a magnetic abnormality did not occur. It can be considered that such a decrease in the resistance and in the resistance-change is due to the changes caused by the magnitude of the current-path-confinement effect of the GMR-screen layer in the acceleration tests.

Figure 20:
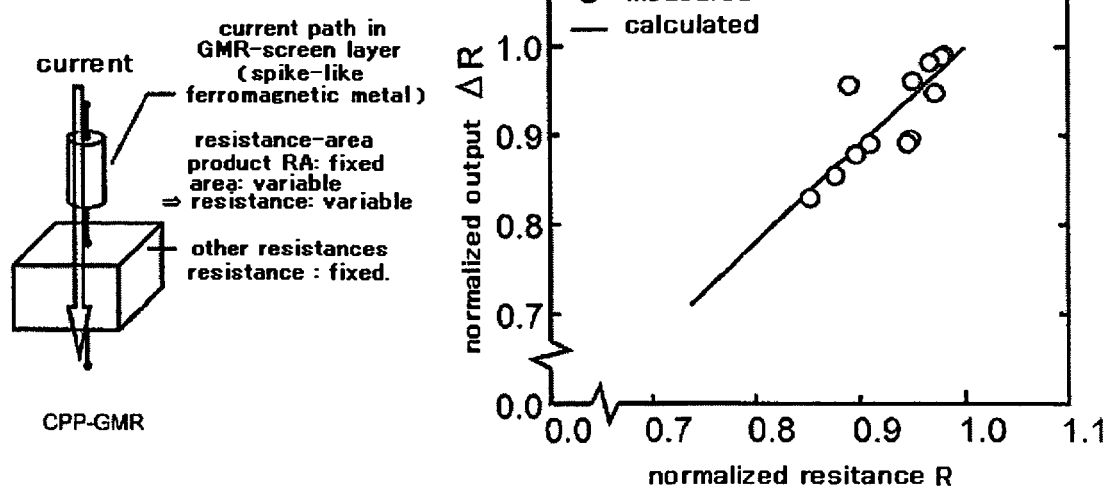
FIG. 20 is a diagram which shows the results of a high temperature acceleration test of a magnetoresistive magnetic head of the present invention through a comparison of the resistance and the resistance change.

FIG. 20 shows the magnitude of the current-path-confinement effect of the GMR screen layer and the relationship between the resistance and the resistance-change. It was assumed that current flows in the entire area of the spike-like ferromagnetic layer of the GMR-screen layer, and what relationship the resistance and the resistance-change have was estimated for the case when this area changes. According to calculations using a simple model shown in the left figure of FIG. 20, the electrical resistance of the magnetic head is expressed by the following expression.

Resistance of magnetic head=area of current path×resistance-area product of current path+resistance of other parts.

When the calculation is carried out on the assumption that only the current path of the GMR-screen has a magnetoresistance effect, the relationship of them becomes that depicted by the straight line in the right graph of FIG. 20. The measured value (open circle) agrees well with the value of the model calculation, and it is understood that the results of the acceleration tests in a high temperature environment depend on changes in the area of the current path of the GMR-screen layer (spike-like ferromagnetic metal).

Figures 21, 22:
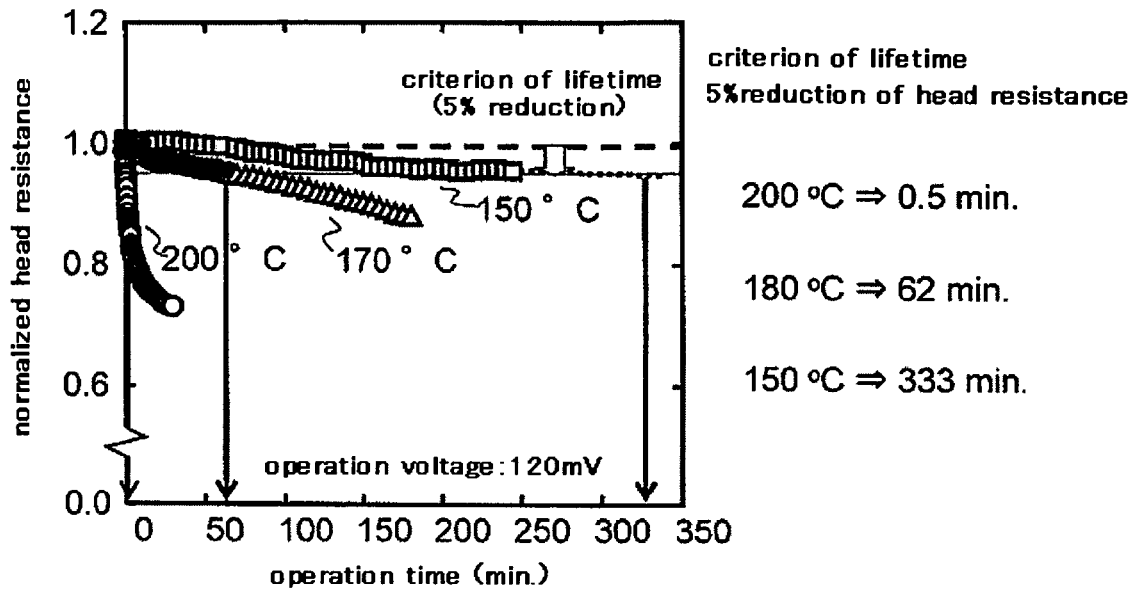
FIG. 21 is a diagram which shows the results of a high temperature acceleration test of a magnetoresistive magnetic head of the present invention.
FIG. 22 is a diagram which shows the results of a high temperature acceleration test of a magnetoresistive magnetic head of the present invention as an Arrhenius plot.

FIG. 21 shows the time-change in the electrical resistance of a magnetic head of the present invention when it is measured similarly by changing the environment temperatures. It is understood that the electrical resistance decreases with time, but the degree to which it decreases becomes larger with increasing environment temperature. If the electrical resistance change is stipulated to be a standard which is, for instance, a 5% reduction in resistance, it is 0.5 min. at an environment temperature of 220° C., 62 min. at 180° C., and 333 min. at 150° C., which means that the relationship between environment temperature and time changes.

FIG. 22 is a diagram showing a relationship in the Arrhenius plot between the environment temperature and time until there is a 5% of decrease in the resistance of the magnetic head. In FIG. 22, the measured values lie on a straight line, namely indicating that the changes in a high temperature acceleration test of a magnetic head of the present invention are thermally activated. The slope of the straight line obtained by a least mean squares method corresponds to about 2.3 eV, which is close to the self-diffusion energy of Co.

Since a GMR-screen layer of a magnetic head of the present invention is formed by Co or a Co alloy and an oxide thereof, it can be thought that thermal diffusion of Co atoms determines the life-time of a magnetic head of the present invention. If such a fine structure is fabricated, sufficient reliability may be not obtained because the thermal-diffusion, which is fast as compared to ordinary diffusion, is rate-determined by both interface-scattering and grain boundary-scattering. However, when the straight line shown in FIG. 22 is extrapolated, it is understood that the magnetic head of the present invention has a life-time longer than 200 years under the conditions of 70° C.+60° C. of self-heating which are the same as the internal parts of a hard disk drive (HDD). It is thought that since a GMR-screen layer of the present invention including a metal part, an oxide part, and upper and lower layers thereof has high crystallinity and becomes a structure in which the crystallinity of these parts are continuous with respect to each other, grain boundary-diffusion is suppressed and a GMR-screen layer is structurally stabilized, resulting in high reliability being achieved.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetoresistive read head comprising:
   a layered structure including a soft magnetic free layer where the direction of magnetization changes corresponding to an external magnetic field, a non-magnetic intermediate layer, and a GMR-screen layer,
   wherein said GMR-screen layer includes a composite of a ferromagnetic metal layer without holes, and an oxide layer with holes which covers said ferromagnetic metal layer, spike parts continuous with said ferromagnetic metal layer being filled convexly in the holes of said oxide layer, wherein current flowing in the film thickness direction is confined by partially passing through said holes, and wherein a magnetoresistive effect is generated corresponding to the relative angular difference between the magnetization of the GMR-screen layer and the magnetization of said soft magnetic free layer.

2. A magnetoresistive read head comprising:
   a magnetoresistive film having a soft magnetic free layer where the direction of magnetization changes corresponding to an external magnetic field, a non-magnetic intermediate layer, a GMR-screen layer having a composite of a ferromagnetic metal layer without holes, and an oxide layer with holes which covers said ferromagnetic metal layer, spike parts continuous with said ferromagnetic metal layer being in the holes of said oxide layer, a separation-coupling layer, a ferromagnetic pinned layer in which the direction of the magnetization is pinned in one direction; and
   a pair of electrodes which flow current in the film thickness direction of said magnetoresistive film,
   wherein said GMR-screen layer is formed between said ferromagnetic pinned layer and said non-magnetic intermediate layer and magnetically coupled with said ferromagnetic pinned layer through said separation-coupling layer.

3. The magnetoresistive read head according to claim 2, wherein
   said oxide layer covers said ferromagnetic metal layer with holes and a part of said ferromagnetic metal layer is exposed to said non-magnetic intermediate layer through the holes of said oxide layer.

4. The magnetoresistive read head according to claim 2, wherein
   said oxide layer covers said ferromagnetic metal layer with holes, said ferromagnetic metal layer is filled convexly in the holes of said oxide layer, and said ferromagnetic metal layer is contacted to the adjacent non-magnetic intermediate layer through the holes of said oxide layer.

5. The magnetoresistive read head according to claim 2, wherein
   said GMR-screen layer is composed of any of Co, CoFe or a Co alloy and an oxide thereof.

6. The magnetoresistive read head according to claim 2, wherein
   said separation-coupling layer is a layer of Cu with a thickness of 0.3 to 1.5 nm.

7. The magnetoresistive read head according to claim 2, wherein
   the crystal grain structures or crystal preferred orientations of said ferromagnetic pinned layer and said non-magnetic intermediate layer, which are stacked through said GMR-screen layer and said soft magnetic free layer are continuous through said GMR-screen layer both in the parts where said oxide layer is present and in the holes of said oxide layer.

8. The magnetoresistive read head according to claim 2, wherein
   both the ferromagnetic metal layer and the oxide layer of said GMR-screen layer have crystalline structures, and the crystal grain structures or crystal preferred orientations of said ferromagnetic pinned layer, said non-magnetic intermediate layer, and said soft magnetic free layer are continuous with said GMR-screen layer.

* * * * *